March 18, 1924.
T. L. TALIAFERRO
1,486,937
METHOD OF MAKING BOTTLE CLOSURES
Filed Sept. 2, 1921
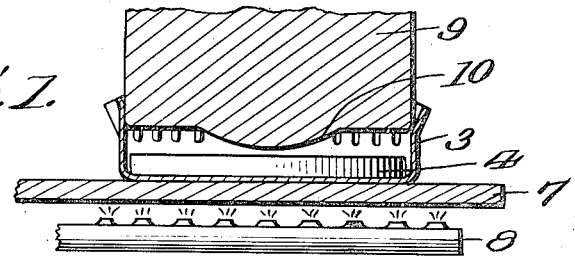
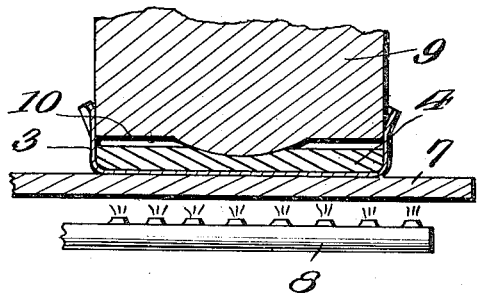
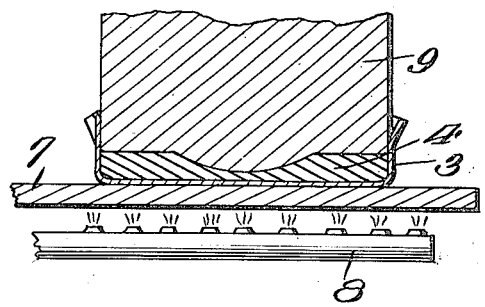
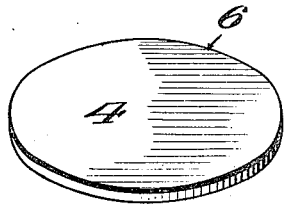
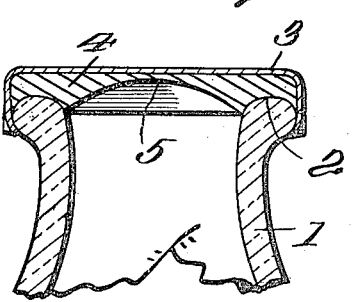
Inventor
Thomas Lucien Taliaferro
By
Sturtevant & Mason
Attorneys Patented Mar. 18, 1924.

1,486,937

UNITED STATES PATENT OFFICE.

THOMAS L. TALIAFERRO, OF CHICAGO, ILLINOIS.

METHOD OF MAKING BOTTLE CLOSURES.

Application filed September 2, 1921. Serial No. 498,107.

*To all whom it may concern:*

Be it known that I, THOMAS L. TALIAFERRO, a citizen of the United States, residing at Chicago, in the county of Cook, State of Illinois, have invented certain new and useful Improvements in Methods of Making Bottle Closures, of which the following is a description, reference being had to the accompanying drawing and to the figures of reference marked thereon.

The invention relates to new and useful improvements in the method of making bottle closures and more particularly the bottle closure of the type known in the art as crown cork and seal cap. An object of the invention is to provide a method of forming a bottle closure wherein a plastic rubber sealing member is formed and shaped within the cap and simultaneously secured thereto.

Another object of the invention is to provide a method of forming a bottle closure wherein a plastic rubber sealing material is formed and shaped within the cap portion of the bottle closure and is caused to adhere to said cap portion by pressure.

These and other objects will in part be obvious and will in part be hereinafter more fully disclosed.

In the drawings which show by way of illustration one way of carrying out the improved method forming the invention:

Fig. 1 is a view showing more or less diagrammatically the cap portion with the sealing disc placed therein and with the shaping die about to make contact with the disc.

Fig. 2 is a similar view but showing the die as having made contact with the sealing material and the beginning of the reshaping process.

Fig. 3 is a similar view but showing the sealing material as having been re-shaped by the die and as having adhered to the closure.

Fig. 4 is a perspective view of the sealing disc before it is applied to the closure or cap.

Fig. 5 is a view showing the bottle closure or cap applied to the mouth of a bottle.

In my copending application, Serial No. 304,485, filed June 16, 1919, I have shown, described and claimed a bottle closure consisting of a cap portion having a depending flange within which cap portion is a sealing material adapted to seal the bottle when the cap or bottle closure is applied thereto. The sealing material is a rubber composition which is plastic, and, therefore, capable of being re-shaped or molded into any desired form, and the sealing material is also preferably of such composition that it has, when cold, a suitable degree of solidity but softens sufficiently with heat such as is necessarily present in the ordinary process of filling bottles with hot liquids, to permit said sealing material to mold or adapt itself to any roughness or any irregularities in the sealing seat or lip of an ordinary bottle, and thereby form a perfectly air-tight joint.

The present application is directed to a method of applying the sealing material to the cap and the present application is a division of my aforesaid copending application. In carrying out the method, the sealing material is preferably applied to the cap portion of the bottle closure in disc shape and is laid or placed within the cap portion after which the cap portion is heated sufficiently to soften the sealing material and render it more plastic to aid in the re-shaping or re-molding of the same, and in order to cause the sealing material to firmly adhere to the metal parts of the cap portion with which it comes in contact. After the cap has been heated sufficiently, then the disc is subjected to die pressure which brings about a re-shaping or re-forming of the plastic rubber sealing material so as to fill the inner parts of the cap and cause said rubber sealing material to adhere to the parts of the cap with which it makes contact and thus become a fixed part of the cap itself.

Referring more in detail to the drawings, I have shown in Fig. 5 a bottle 1 having the usual form of lip or seat 2 with my improved bottle cap or closure sealed thereon, said cap or closure consisting of a metal portion 3 which is of the usual shape of the crown cork and seal cap, although from certain aspects of the invention any other form of metal cap may be used which metal cap spans the mouth of the bottle and is provided with means whereby it may be attached to the bottle. Within the cap portion of the closure 3 is a sealing material 4, which sealing material is thickened directly over the seat or lip 2 of the bottle and makes direct contact with said seat or lip. The sealing material is dished out as indicated at 5 directly over the mouth of the bottle, but said sealing material preferably spans the entire mouth of the bottle so as to completely cover the metal of the cap and prevent the contents of the bottle coming in contact therewith.

In carrying out the method, a sealing material is used which is preferably of some form of rubber substantially free of any vulcanizing agent so that the rubber is plastic and capable of being re-shaped and retaining the shape into which it is molded. This rubber composition is of such a character that it will firmly adhere to the metal parts of the cap when slightly heated and pressed against the same. It is also of such a character that when the bottle is sealed said sealing material through the heat of the liquid contents of the bottle softens sufficiently to adapt itself to any unevenness in the surface of the glass forming the lip of the bottle. A sealing material of the above character is preferably formed into the shape of a disc as indicated at 6 in Fig. 4. The disc is of less diameter than the inner diameter of the cap 3 so that the disc may be freely placed in the cap with the cap bottom side up. The cap with the disc therein is then placed on a support 7 which is heated by a gas flame from a burner 8 sufficiently to increase the plasticity of the sealing material and aid in the re-shaping of said sealing material and the adhering of the sealing material to the metal portion of the closure with which it comes in contact.

A die indicated at 9 in the drawings is formed with a die face 10, which is shaped as shown in the drawings with a rounded central projection concentrically located relative to a flat annular section. The die is moved down into the cap and into contact with the sealing material 4 and as it is pressed against the sealing material it will cause a re-shaping of the sealing material. The sealing material will flow outwardly and make contact with the flange of the cap. The sealing material will also form a thickened ring portion adapted to engage the lip or seat of the bottle and a relatively thin portion which spans the mouth of the bottle. It will be understood that I have used the term disc purely in a descriptive sense and that the sealing material may be otherwise formed when initially placed in the cap and before being subjected to die pressure. It will also be understood that the particular shape of the sealing substance is immaterial, the essential features consisting in the use of a plastic sealing material capable of being re-shaped or re-molded when subjected to pressure, the placing of such material in the cap and the re-shaping or re-molding of such material when placed in the cap after causing the material to be properly shaped for sealing purposes and for causing the material to adhere to and become a permanent or fixed part of the bottle cap or closure. It will also be understood that while I have referred to a bottle closure that I use the term bottle in a broad sense as meaning any receptacle having a restricted mouth which is to be closed by a cap or closure.

Having thus described the invention, what I claim as new and desire to secure by Letters Patent is:

The method of forming a bottle closure comprising placing a disk of plastic rubber, capable of being reshaped and retaining its new shape, within a metal cap having a flange and subjecting said disk of plastic rubber to heat and pressure for re-shaping the same so as to form a relatively thick sealing ring adhering to the metal cap and becoming a fixed part thereof, which ring is adapted to engage the lip of the bottle when the cap is applied thereto for closing the same.

In testimony whereof I affix my signature.

THOMAS L. TALIAFERRO.